United States Patent [19]
Sutter et al.

[11] Patent Number: 5,460,396
[45] Date of Patent: Oct. 24, 1995

[54] DERAILLEUR MOUNTING ASSEMBLY FOR A BICYCLE

[75] Inventors: Edmund E. Sutter; George E. Clarke, both of Janesville, Wis.

[73] Assignee: Roadmaster Corporation, Olney, Ill.

[21] Appl. No.: 73,156

[22] Filed: Jun. 7, 1993

Related U.S. Application Data

[63] Continuation-in-part of Ser. No. 14,451, Feb. 5, 1993, abandoned.

[51] Int. Cl.[6] .................................................. B62K 25/28
[52] U.S. Cl. ........................................... 280/284; 280/261
[58] Field of Search ................................... 280/283, 284, 280/259, 260, 261, 275, 281.1; D12/124, 127; 74/594.2; 180/227

[56] References Cited

U.S. PATENT DOCUMENTS

| | | | |
|---|---|---|---|
| 3,913,947 | 10/1975 | Harris | 280/261 |
| 4,023,424 | 5/1977 | Ryan et al. | 280/261 |
| 4,330,137 | 5/1982 | Nagano | 280/238 |
| 4,421,337 | 12/1983 | Pratt | 280/284 |
| 4,582,335 | 4/1986 | Paioli et al. | 280/278 |
| 5,123,878 | 6/1992 | Nagano | 474/160 |
| 5,217,241 | 6/1993 | Girvin . | |
| 5,332,246 | 7/1994 | Buell | 280/284 |

FOREIGN PATENT DOCUMENTS

| | | | |
|---|---|---|---|
| 2683785 | 5/1993 | France | 280/284 |
| 9303953 | 3/1993 | WIPO | 280/281.1 |
| 9313974 | 7/1993 | WIPO | 280/284 |

OTHER PUBLICATIONS

"Impact Eaters" and various advertisements regarding bicycle suspension forks, Bicycling, pp. 72–73, and 148–166, May 1992.

"The 11 Hottest Bikes of '92," Bicycling, pp. 36–54, Feb. 1992.

Nishiki advertisement showing a Noleen shock having inner pistons that are nitrogen charged and a pivotable chainstay, Bicycling, p. 9, Aug. 1992.

Offroad Pro–Flex bicycle advertisement showing a pivotable chainstay, Bicycling, p. 73, May 1992.

Primary Examiner—Richard M. Camby
Assistant Examiner—Carla Mattix
Attorney, Agent, or Firm—Willian Brinks Hofer Gilson & Lione; Steven P. Shurtz; Curt J. Whitenack

[57] ABSTRACT

A derailleur mounting assembly for a bicycle having a rear wheel suspension includes a chain stay having a first end connected to a bicycle crank in a manner so as to pivot about the crank axis, and a derailleur mounted on the chain stay. The chain stay is operable to pivot about the crank axis when the rear wheel suspension allows a rear wheel to move. This allows the derailleur to be maintained in a stationary position with respect to a bike chain extended between the bicycle crank and a sprocket attached to a rear wheel.

18 Claims, 4 Drawing Sheets

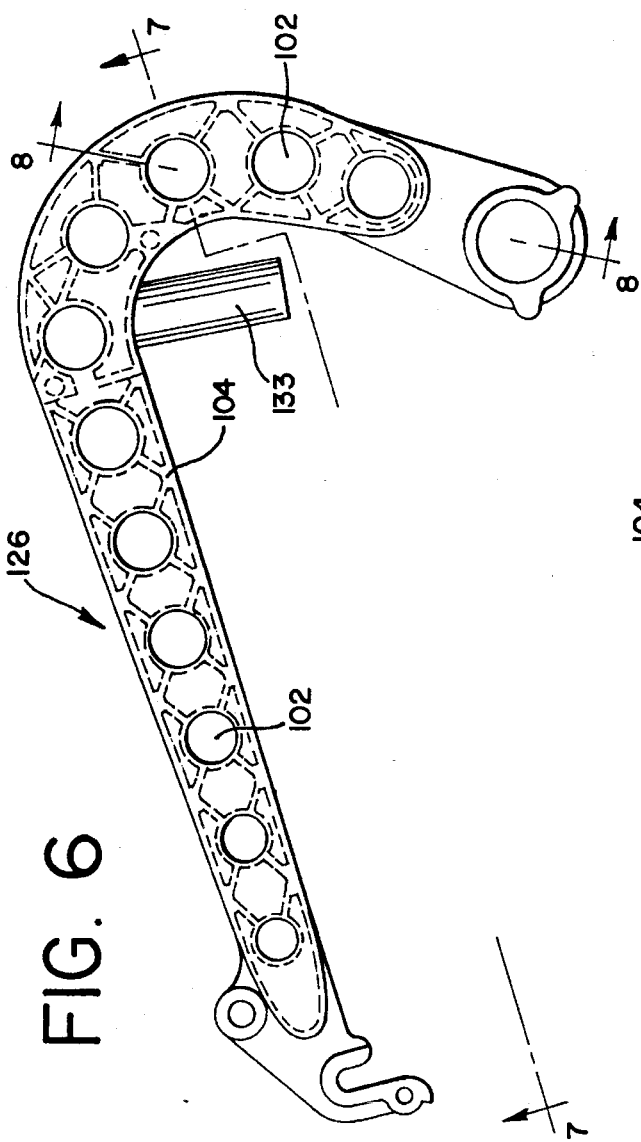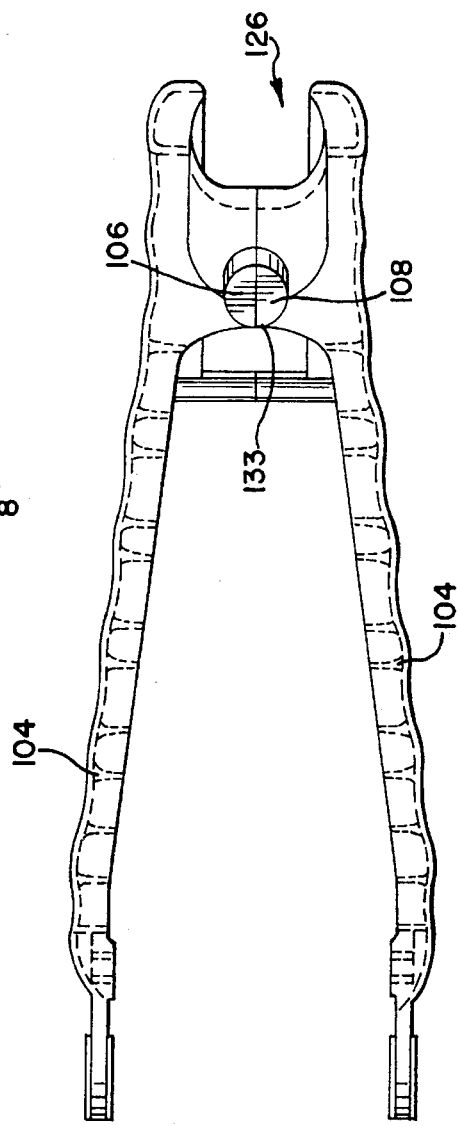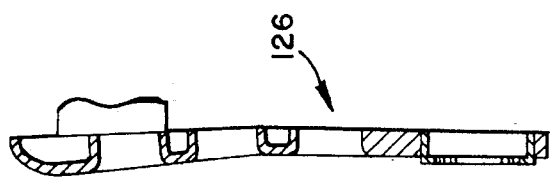

5,460,396

DERAILLEUR MOUNTING ASSEMBLY FOR A BICYCLE

CROSS-REFERENCE TO RELATED APPLICATION

This application is a continuation-in-part of patent application Ser. No. 08/014,451, filed on Feb. 5, 1993, now abandoned the contents of which are hereby incorporated by reference.

BACKGROUND OF THE INVENTION

This invention relates generally to the field of bicycles, and more particularly to derailleur assemblies for bicycles.

A derailleur is a mechanism for shifting gears on a bicycle that operates by moving the bike chain from one set of exposed gears to another. Conventionally, derailleurs have been secured to bicycle frames or other immobile parts to prevent the derailleurs from moving with respect to the bike chain. This is important because the angle formed between the bicycle seat tube and the chain stay (the "chainstay angle") must stay relatively constant for the derailleur to operate as designed. A brochure from Shimano, one of the leading manufacturer of derailleur assemblies, states that the chainstay angle must be fixed in a range of three degrees, i.e., from 63° to 66°, for the specified derailleur to be operative. Therefore, as can be deduced, the position of a derailleur with respect to a bicycle chain must be kept within a tolerance of a few degrees for the derailleur to operate properly.

With the advent of rear suspension forks on bicycles, the chain is not always maintained in the same position with respect to the frame. For example, when the rear wheel moves upward, the angle between the seat tube (from which the derailleur is generally suspended) and the chain decreases. In this position, the derailleur is not optimally positioned to change gears. Hence, a need for a derailleur mounting assembly that allows the derailleur to remain at a constant angle relative to the bike chain, even though the rear fork allows the rear bicycle wheel to move, has arisen.

The present invention overcomes the above-described disadvantages of the prior art by providing a mounting for a derailleur assembly that is pivoted about the bicycle crank axis and that moves relative to the movement of the rear wheel and the chain. The pivotability of the derailleur assembly about the crank axis insures that the derailleur's position remains constant with respect to the bike chain during operation of the bicycle. Thus, this design allows a bicycle to incorporate a rear suspension fork without any problems resulting in gear-shifting capabilities.

SUMMARY OF THE INVENTION

According to a first aspect of the present invention, a derailleur mounting assembly for a bicycle having a rear wheel suspension includes a chain stay having a first end connected to a bicycle crank in a manner so as to pivot about the bicycle crank axis, and a derailleur mounted on the chain stay.

According to a second aspect of the present invention, a bicycle includes a frame, a rear wheel suspension for attaching a rear wheel to the frame in a manner allowing the rear wheel to move with respect to the frame, a chain extended between a crank mounted on the frame and a sprocket attached to the rear wheel, and a derailleur mounted on the bicycle, the derailleur operable to follow the chain when the rear wheel moves with respect to the frame such that the derailleur is maintained in a stationary position with respect to the chain.

BRIEF DESCRIPTION OF THE DRAWINGS

FIG. 6 is a front view of an alternate embodiment of the chain stay;

FIG. 7 is a view taken along line 7—7 of FIG. 6; and

FIG. 8 is a view taken along line 8—8 of FIG. 6.

DETAILED DESCRIPTION OF THE PRESENTLY PREFERRED EMBODIMENTS

Figure 1:
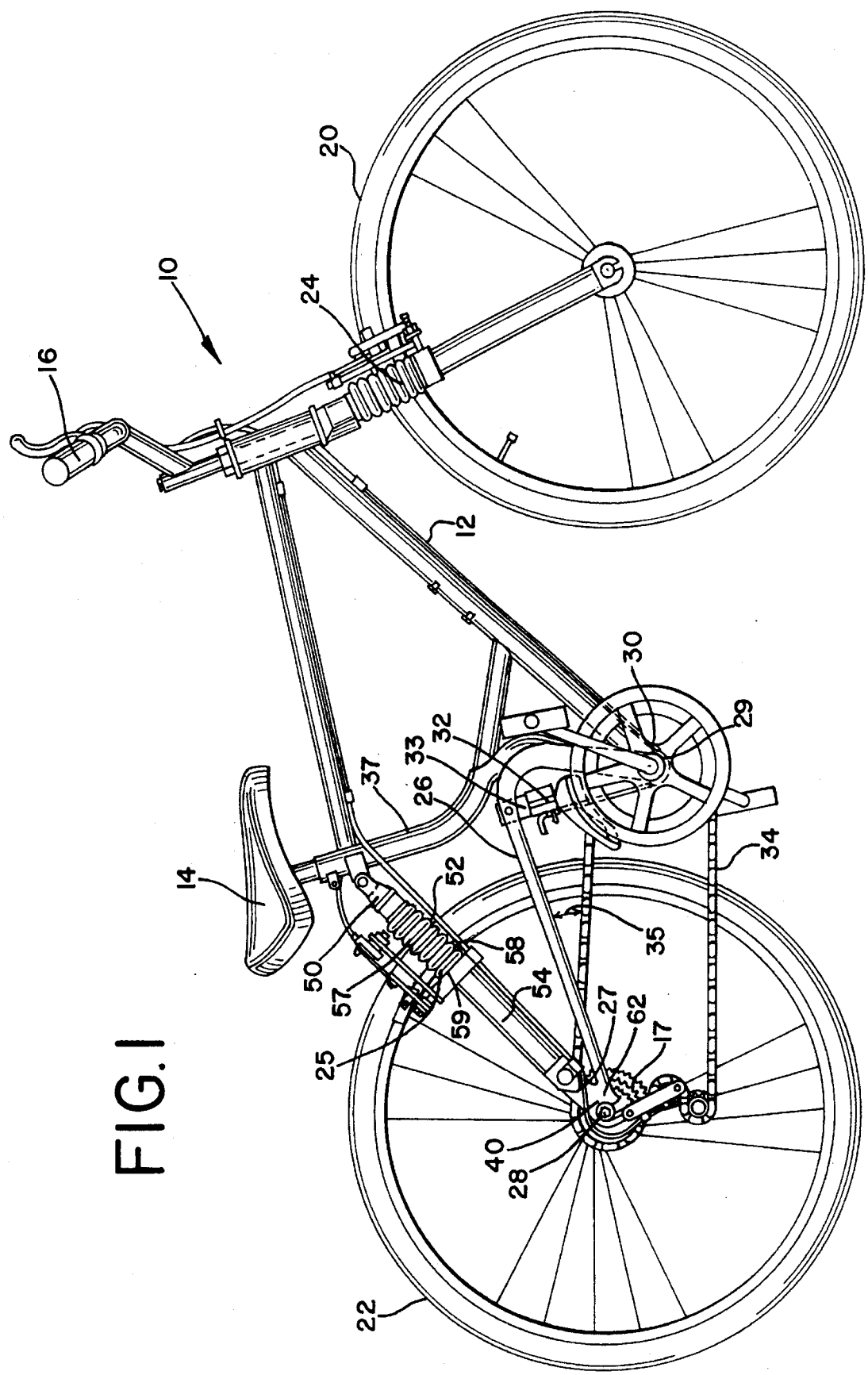
FIG. 1 is a side view of a bicycle incorporating a preferred embodiment of the present invention.

As shown in FIG. 1, a bicycle 10 includes a frame 12, a seat 14, handlebars 16, a front wheel 20, a rear wheel 22, a front suspension fork assembly 24, a rear suspension fork assembly 25, a seat tube 37, and a rear chain stay 26 connected at one end 27 to a rear wheel axle 28 having a sprocket 17 and pivotally connected at the other end 29 to the crank 30. (Only one chain stay 26 will be referred to in the application, but it should be understood that there are actually two complementary chain stay elements that are joined together to form the chain stay 26.)

Preferably, the chain stay 26 is substantially U-shaped and extends above a line formed between the rear wheel axle 28 and the bicycle crank 30. Alternately, however, the chain stay 26 may be positioned below the line formed between the rear axle 28 and the crank 30, or be configured in any other suitable manner. The chain stay 26 is preferably connected to the bottom bracket 31 by being pressed onto a bronze bearing (not shown) disposed around the outside of the bottom bracket.

An alternate embodiment of the chain stay 126 is shown in FIGS. 6, 7 and 8. The chain stay 126 is formed from cast aluminum and has a plurality of holes 102 drilled therethrough to reduce its weight. Strengthening ribs 104 are also present on the inside of the chain stay 126 to strengthen the chain stay 126. As best shown in FIG. 7, the support bar 133 comprises two pieces 106, 108 that are joined together when the chain stay elements are bolted together at points X to form the chain stay 126.

Figure 2:
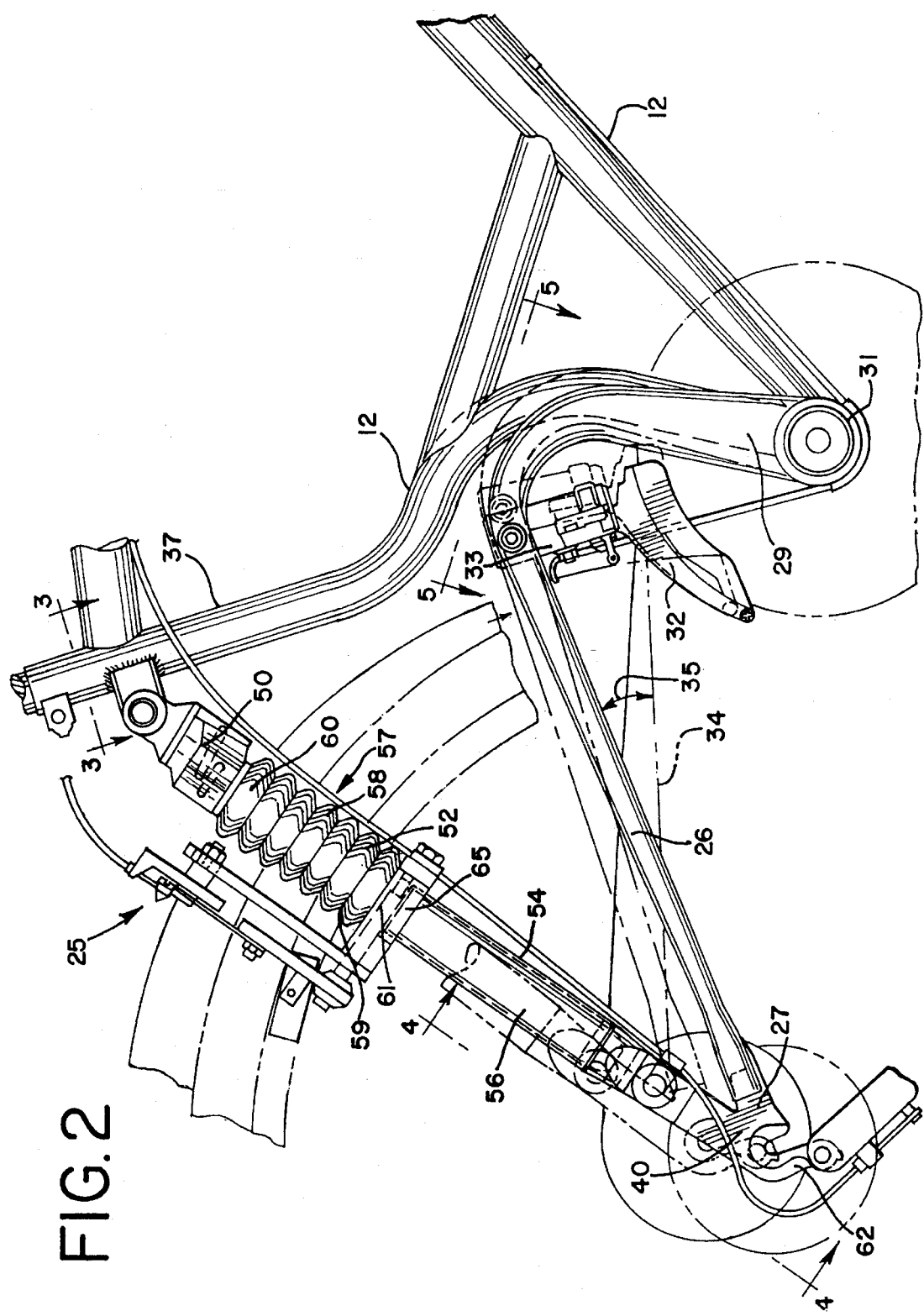
FIG. 2 is an enlarged view of the derailleur assembly of the present invention, with the motion of the derailleur assembly and the rear wheel of the bicycle depicted by dashed lines.
Figure 3:
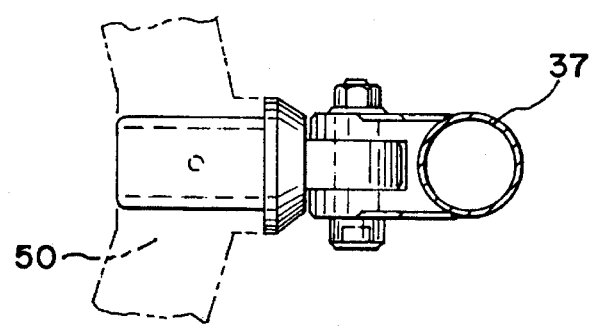
FIG. 3 is a plan view taken along line 3—3 of FIG. 2 showing the connection between the shock absorber assembly and the bicycle frame.
Figure 4:
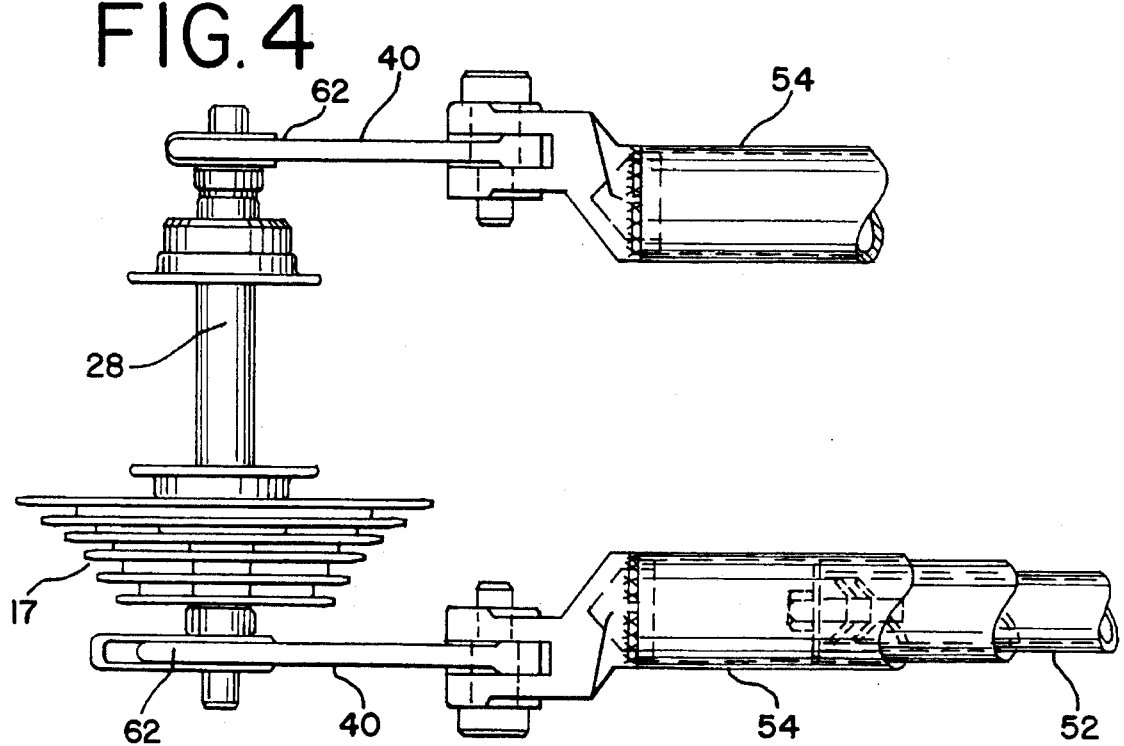
FIG. 4 is a plan view taken along line 4—4 of FIG. 2 showing the rear wheel axle and the rear bicycle fork.
Figure 5:
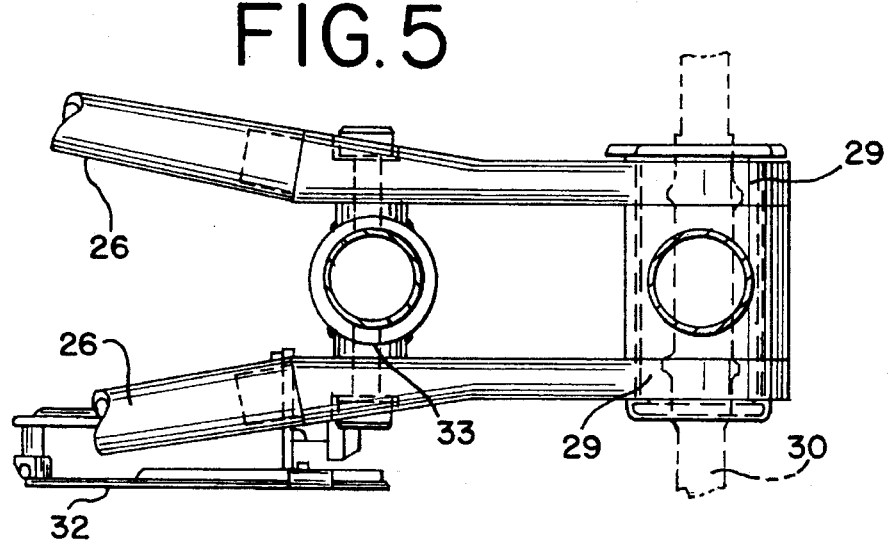
FIG. 5 is a plan view taken along line 5—5 of FIG. 2 showing the derailleur and the derailleur support stay.

As best shown in FIGS. 1 and 5, a derailleur 32, preferably Model No. FD-CT10 supplied by Shimano, is bolted or otherwise mounted on the support bar 33 extending from the chain stay 26 in a desired position with respect to the bike chain 34. As illustrated in FIGS. 2–4, the rear suspension fork assembly 25 has one end connected to the seat tube 37 and the other end 40 connected to the rear wheel axle 28. Preferably, however, the first end 27 of the chain stay 26 is integrally connected to the bottom end 40 of the rear fork assembly 25.

A preferred embodiment of a design of the rear fork assembly 25 is shown in FIGS. 1–4. The rear fork assembly 25 may also serve as a pattern for the design of the front fork assembly 24. When the bicycle 10 travels over a rough surface, the suspension fork assembly 25 and/or 24 functions to dampen the shock transmitted by the surface through the bicycle frame 12 to the rider, and to keep the wheels 20, 22 on the ground.

As shown in FIGS. 1–4, the rear fork assembly 25 preferably includes a cross support 50, two stanchion tubes 52 connected to the cross support 50, two receiving tubes 54 encasing a bottom portion 56 of a respective one of the stanchion tubes 52, two bushing tubes disposed along the length of a respective receiving tube 54 between the receiving tube 54 and the bottom portion 56 of the respective stanchion tube 52, and two compressible systems 57 each comprising a stack of toroidal elastomer members 58 disposed around the top portions 60 of the stanchion tubes 52 between the cross support 50 and the receiving tubes 54. The receiving tubes 54 each terminate in a bicycle wheel axle connector 62.

The shock absorbing function of the rear fork assembly 25 is controlled by the toroidal members 58. When the force imparted by the rough surface to the bicycle 10 is such that the toroidal members 58 are compressed between the cross support 50 and the receiving tubes 54, the motion of the stanchion tubes 52 within the receiving tubes 54 is allowed to "soften" the jolts created by the surface.

In addition to the shock absorbing function, the toroidal members 58 also perform a dust cover function. In particular, the bottom toroidal members 59 are formed with a dust cover flange 61 that extends tightly into a recess (not shown) formed at the top of the retainer collar 65 and over a bearing surface (not shown). The flange 61 prevents dust and other deleterious material from entering into the stanchion tubes 52 and the receiving tubes 54. A more detailed description of the fork assemblies 24, 25 may be found in patent application Ser. No. 08/014,460, entitled "Suspension Fork for a Bicycle" and filed on Feb. 5, 1993, and a patent application Ser. No. 08/060,317 entitled "Suspension Fork for a Bicycle" and filed on May 11, 1993, which applications are hereby incorporated by reference.

As illustrated by the dashed and solid lines in FIG. 2, when the rear wheel 22 travels over a bump, the rear fork assembly 25 allows the wheel 22 to move in an upward and downward motion. Since the chain 34 is indirectly connected to the rear wheel axle 28 via the sprocket 17 (See FIG. 4), the motion of the wheel 22 also causes the chain 34 to move from the position shown in FIG. 1. However, because the derailleur 32 is mounted on the chain stay 26, which pivots with respect to the crank 30, the derailleur 32 is able to follow the chain 34 through its movement such that the distance between the derailleur 32 and the chain 34 and the angle 35 between the chain stay 26 and the chain 34 remain constant.

In an alternate embodiment of the present invention, the derailleur mounting assembly (not shown) includes a chain stay having one end connected to a rear wheel axle and the other end pivotally connected to the seat tube. A derailleur support post has a derailleur mounted thereon and has one end pivotally connected to the bicycle crank. A linkage is pivotally connected between the support post and the chain stay such that the motion of the chain stay induced by the movement of the rear wheel causes the derailleur to remain in a stationary position with respect to the bike chain.

It should be appreciated that the derailleur assembly of this invention may be configured as appropriate for the application. For example, the derailleur 32 may be mounted on a chain stay 26 that extends below the line formed between the rear wheel axle 28 and the crank 30. Furthermore, any suitable number of linkages may be utilized to insure that the position of the derailleur 32 is maintained with respect to the chain 34.

The embodiments described above are to be considered in all respects only as illustrative and not restrictive. The scope of the invention is indicated by the following claims rather than by the foregoing description. All changes which come within the meaning and range of equivalency of the claims are to be embraced within their scope.

What is claimed is:

1. A derailleur mounting assembly for a bicycle having a rear wheel, a rear wheel suspension, a bicycle crank having at least two sprockets and an axis of rotation, and a chain extending between the rear wheel and the bicycle crank, the derailleur mounting assembly comprising:

a) a chain stay having a first end pivotally connected to the bicycle crank, the chain stay operable to pivot concentrically about the bicycle crank axis; and b) a front derailleur mounted on the chain stay for controlling the position of the chain with respect to the sprockets attached to the bicycle crank.

2. The derailleur mounting assembly of claim 1, wherein the chain stay is operable to pivot about the bicycle crank axis when the rear wheel suspension allows the rear wheel to move such that an angle formed between the chain stay and the chain extended between the bicycle crank and a sprocket attached to the rear wheel axle remains constant.

3. The derailleur mounting assembly of claim 1 wherein the rear wheel includes a rear axle, and wherein a second end of the chain stay is connected to the rear wheel axle.

4. The derailleur mounting assembly of claim 1 wherein the rear wheel includes a rear wheel axle, and wherein the rear wheel suspension is connected between a bicycle frame and the rear wheel axle.

5. The derailleur mounting assembly of claim 1 wherein the rear wheel suspension comprises a plurality of toroidal elastomer members.

6. The derailleur mounting assembly of claim 1 wherein the derailleur maintains a constant position with respect to the chain when the rear wheel suspension allows the rear wheel to move up and down.

7. A bicycle comprising:

a) a frame;

b) a rear wheel suspension for attaching a rear wheel to the frame in a manner allowing the rear wheel to move up and down with respect to the frame;

c) a chain extended between a crank mounted on the frame and a sprocket attached to the rear wheel, the crank having a plurality of sprockets; and d) a front derailleur mounted on the bicycle for controlling the position of the chain with respect to the sprockets attached to the crank, the front derailleur operable to follow the chain up and down when the rear wheel moves with respect to the frame such that the front derailleur maintains a constant position with respect to the chain during the movement of the rear wheel.

8. The bicycle of claim 7, wherein the rear wheel further comprises a rear wheel axle, and wherein the front derailleur is mounted on a chain stay having one end connected to the rear wheel axle and the other end pivotally connected to the crank.

9. The bicycle of claim 8 wherein the chain stay is substantially U-shaped and extends above a line formed between the rear wheel axle and the crank.

10. The bicycle of claim 7 further comprising a front wheel suspension having one end connected to the frame and the other end connected to a front wheel axle.

11. The bicycle of claim 7 wherein the rear wheel suspension comprises a plurality of toroidal elastomer members.

12. A derailleur mounting assembly for a bicycle having a rear wheel suspension connected between a bicycle frame and a rear wheel axle, the assembly comprising:
   a) a U-shaped chain stay having a first end and a second end, the first end pivotally connected to a bicycle crank having an axis of rotation, the second end connected to the rear wheel axle, the chain stay operable to pivot about the bicycle crank axis; and
   b) a front derailleur mounted on the chain stay, the chain stay pivoting about the bicycle crank axis when the rear wheel suspension allows a rear wheel to move up and down such that an angle formed between the chain stay and a bike chain extended between the bicycle crank and a sprocket attached to the rear wheel axle remains constant.

13. A bicycle comprising:
   a) a frame;
   b) a rear wheel suspension for attaching a rear wheel having an axle to the frame in a manner allowing the rear wheel to move up and down with respect to the frame;
   c) a chain extended between a crank mounted on the frame and a sprocket attached to the rear wheel; and
   d) a derailleur mounted on a substantially U-shaped chain stay having one end connected to the rear wheel axle and the other end pivotally connected to the crank, the chain stay extending above a line formed between the rear wheel axle and the crank, the derailleur operable to follow the chain when the rear wheel moves with respect to the frame such that the derailleur maintains a constant position with respect to the chain during the movement of the rear wheel.

14. A bicycle comprising:
   a) a frame;
   b) a rear wheel having an axle, the rear wheel connected to the frame;
   c) a rear wheel suspension connected between the frame and the rear wheel axle, the rear wheel suspension allowing the rear wheel to move up and down with respect to the frame;
   d) a bicycle crank connected to the frame, the bicycle crank including at least two crank sprockets connected thereto;
   e) a chain stay having a first end pivotally connected to the bicycle crank and a second end connected to the rear wheel axle;
   f) a rear derailleur operatively associated with the rear wheel axle; and
   g) a front derailleur mounted on the chain stay and operatively associated with the at least two crank sprockets.

15. A derailleur mounting assembly for a bicycle having a rear wheel suspension connected between a bicycle frame and a rear wheel axle, the assembly comprising:
   a) a chain stay having a first end pivotally connected to a bicycle crank, the bicycle crank having an axis of rotation and at least two sprockets attached thereto, the chain stay operable to pivot about the bicycle crank axis; and
   b) a front derailleur mounted on the chain stay, the chain stay pivoting about the bicycle crank axis when the rear wheel suspension allows a rear wheel to move up and down such that during the movement of the rear wheel, the front derailleur maintains a constant position with respect to the sprockets and a chain extending between the sprockets and the rear wheel axle.

16. A bicycle comprising:
   a) a frame;
   b) a rear wheel having an axle, the rear wheel connected to the frame;
   c) a rear wheel suspension connected between the frame and the rear wheel axle, the rear wheel suspension allowing the rear wheel axle to move with respect to the frame;
   d) a bicycle crank connected to the frame;
   e) a chain extending between the bicycle crank and the rear wheel, the chain having an upper segment defining a chain line;
   f) a chain stay having a first end connected to the bicycle crank and a second end connected to the rear wheel axle; and
   g) a front derailleur mounted on the chain stay, the bicycle crank defining a pivot point below the chain line about which the chain stay pivots.

17. The derailleur mounting assembly of claim 12 wherein the chain stay is operable to pivot concentrically about the bicycle crank axis.

18. A derailleur mounting assembly for a bicycle having a rear wheel, a rear wheel axle, a rear wheel suspension, a bicycle crank having at least two sprockets and an axis of rotation, and a chain extending between the rear wheel and the bicycle crank, the derailleur mounting assembly comprising:
   a) a substantially U-shaped chain stay having a first end pivotally connected to the bicycle crank, the chain stay operable to pivot concentrically about the bicycle crank axis, wherein the chain stay extends about a line formed between the rear wheel axle and the bicycle crank; and
   b) a derailleur mounted on the chain stay for controlling the position of the chain with respect to the sprockets attached to the bicycle crank.

* * * * *